May 17, 1960     H. O. FOLKINS ET AL     2,937,214
CATALYST COMPRISING PALLADIUM ON SILICA-ALUMINA TREATED
WITH A CARBOXYLIC ACID, METHOD OF PREPARATION, AND
ISOMERIZATION PROCESS USING SAME
Filed Sept. 18, 1958
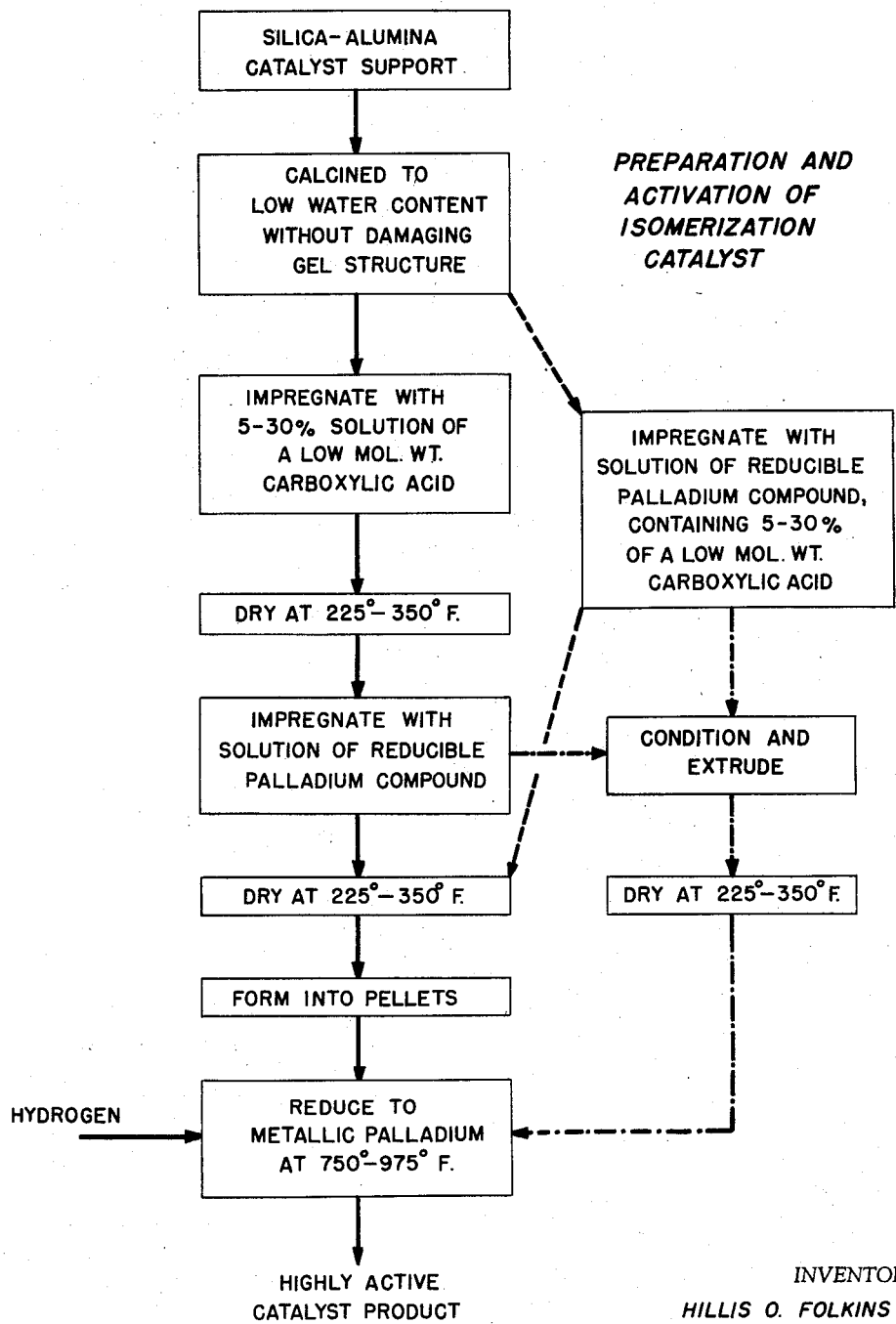
INVENTORS
HILLIS O. FOLKINS
BY ELMER MILLER
ATTORNEY

United States Patent Office 2,937,214
Patented May 17, 1960

2,937,214

CATALYST COMPRISING PALLADIUM ON SILICA-ALUMINA TREATED WITH A CARBOXYLIC ACID, METHOD OF PREPARATION AND ISOMERIZATION PROCESS USING SAME

Hillis O. Folkins, Crystal Lake, and Elmer L. Miller, Cary, Ill., assignors to The Pure Oil Company, Chicago, Ill., a corporation of Ohio Application September 18, 1958, Serial No. 761,713

11 Claims. (Cl. 260—683.65)

This invention relates to new and useful improvements in processes for the hydroisomerization of normal paraffin hydrocarbons having four to seven carbon atoms per molecule, and more particularly to an improved isomerization catalyst and method of preparing the same.

It has been found that the hydroisomerization of hydrocarbon feed stocks consisting predominantly of normal paraffin hydrocarbons having four to seven carbon atoms per molecule can be efficiently carried out by passing the feed stocks over a catalyst under moderate temperature isomerization conditions. When paraffin hydrocarbons are isomerized in this manner, a mixture of hydrogen and the hydrocarbon in a hydrogen/hydrocarbon mol ratio in the range from about 0.5 to 5.0, is passed over a composite catalyst at a pressure within the range from about 100 to 1,000 p.s.i.g. and a temperature within the range from about 600° to 800° F. The most effective composite catalyst for isomerization of normal paraffin hydrocarbons under the conditions just described consists of an acidic silica-alumina support having deposited thereon from 0.01 to 1.0 wt. percent of palladium. In accordance with this invention, it has been found that the treatment of the silica-alumina support with a 5–30% solution of a low-molecular-weight carboxylic acid, such as acetic acid, either prior to or concomitantly with the deposition of palladium on the support, produces an isomerization catalyst having superior isomerization activity.

It is, therefore, one object of this invention to provide an improved process for the preparation of a highly active isomerization catalyst.

Another object of this invention is to provide a highly active isomerization catalyst capable of effecting the isomerization of low-molecular-weight normal paraffins to isoparaffins in high yield.

Another object of this invention is to provide an improved process for the isomerization of hydrocarbon feed stocks consisting predominantly of low-molecular-weight normal paraffins.

A feature of this invention is the provision of a process for the preparation of highly active isomerization catalysts in which a silica-alumina support is treated with a dilute solution of a low-molecular-weight organic acid, such as acetic acid, and with a solution of a reducible palladium compound, and the impregnated support reduced with hydrogen at elevated temperatures to produce a highly active catalyst.

Another feature of this invention is the provision of an improved isomerization catalyst consisting of 0.01–1.0 wt. percent of palladium on silica-alumina, containing 50–95% silica, in which the silica-alumina support has been treated with a dilute aqueous solution of a low-molecular-weight organic acid, such as acetic acid, either prior to or concomitantly with the impregnation of the support with a palladium compound.

A further feature of this invention is the provision of an improved process for isomerization of normal paraffin hydrocarbons in which said hydrocarbons are passed with hydrogen at an elevated pressure, and a temperature in the range from about 600°–800° F., over a catalyst consisting of 0.01–1.0 wt. percent palladium on silica-alumina, containing 50–95% silica, which catalyst has been treated with a low-molecular-weight organic acid, such as acetic acid, prior to or concomitantly with the deposition of palladium thereon.

Other objects and features of this invention will become apparent from time to time throughout the specification and claims as hereinafter related.

In the accompanying drawings, there is set forth a flow diagram of a preferred embodiment of our process for preparing an improved isomerization catalyst.

According to this invention, it has been found that the effectiveness of a palladium-promoted, silica-alumina, composite isomerization catalyst can be enhanced by treating the silica-alumina support with a solution of a low-molecular-weight organic acid, such as acetic acid, either prior to or concomitantly with the deposition of palladium thereon. In the preparation of catalyst compositions in accordance with this invention, the palladium metal is incorporated in the silica-alumina support by impregnation of the support with a solution of a reducible palladium salt, such as the chloride or nitrate, or with a solution of a mixed palladium salt, such as ammonium chloropalladite. The preparation of the supported catalyst is generally carried out by impregnating the support with an aqueous solution of palladium chloride, sometimes containing small amounts of an inorganic acid such as hydrochloric acid. In our process, the catalyst support is wetted with a dilute solution of from about 5 to 30% of acetic acid in water or other suitable solvent. The catalyst support used is a silica-alumina, containing 50–95 wt. percent silica, which has been precalcined to produce a low water content without damaging the gel structure. Precalcination of the support is preferably limited so that about 0.75–1.00 wt. percent of water remains on the surface of the support, and/or in the structure of the support. Alternately, milder precalcination may be employed whereby the amount of water left on or in the support is as high as 3–4 wt. percent. The catalyst support which has been wetted with acetic acid solution is then dried at about 225°–350° F., preferably about 230° F. The catalyst support is then impregnated with a solution of a reducible palladium salt. The impregnated catalyst is dried at about 225°–350° F., and is formed into pellets by a suitable pelleting machine. Alternately, the impregnated catalyst may be conditioned for extrusion either by adjustment of the water content, generally to a range of 50–65%, or by the addition of inert lubricants or binders. The catalyst mass then is extruded and cut into suitable lengths. The catalyst so formed is dried, if necessary, and is activated by reduction with hydrogen at a temperature of about 750° to 975° F. The catalyst which is thus produced has a concentration of palladium metal thereon which is determined by the concentration of the solution of palladium salt used to impregnate the catalyst support.

As an alternative method of preparing the catalyst, the acid-treating step and impregnation with palladium salt may be combined. In this method the palladium salt is added as an aqueous solution containing 5–30% acetic acid, or other low-molecular-weight carboxylic acid. Other acids which may be used include formic acid, propionic acid, butyric acid, and valeric acid. The catalyst which is prepared and activated as just described is a much more active catalyst and produces higher yields of isoparaffins than does a catalyst prepared in the same manner without the acid treatment of the catalyst support.

When hydrogen and $C_4$-$C_7$ normal paraffins in a hydrogen/hydrocarbon mol ratio within the range of about 0.5-5.0 are passed over a catalyst prepared and activated as above-described, at a temperature of about 600°-800° F., a pressure of 100-1000 p.s.i.g., and a liquid volume hourly space velocity of 0.5 to 10.0, a yield of isoparaffins is obtained which is much higher than is obtained using a catalyst of the same composition which has not had the acid treatment.

The following non-limiting examples illustrate the preparation of palladium-containing isomerization catalysts, both with and without acetic acid treatment, and the relative activity of such catalysts in the hydroisomerization of low-molecular-weight normal paraffin hydrocarbons.

EXAMPLE I

A commercial silica-alumina cracking catalyst, containing 13% alumina and 87% silica, was dried at 400° F. for a period of 3 hours. A 250 g. portion of the catalyst support was then impregnated at 120° F. with a solution of 1.4 g. of palladium chloride in 250 cc. of a water solution which contained 25 cc. of glacial acetic acid. The amount of solution used was just sufficient to fill the pores of the catalyst support. The impregnated catalyst mass was dried at 230° F. and formed into pellets. The catalyst pellets were then activated by heating at 975° F. in a current of hydrogen for a period of 16 hours to reduce the palladium salt to metallic palladium in a highly active form. After reduction with hydrogen, the catalyst pellets contained 0.33 wt. percent palladium. The catalyst thus prepared was evaluated in the isomerization of n-pentane.

Hydrogen and n-pentane in a 1:1 mol ratio were circulated over the catalyst at a temperature of 703° F., a pressure of 500 p.s.i.g., and a liquid volume hourly space velocity of 3.0. The liquid volume hourly space velocity is defined as liquid volume of hydrocarbon fed per hour per unit volume of effective catalyst bed. Under the above reaction conditions, isopentane was obtained in a yield of 50.5% and selectivity of 98.8%. When the reaction temperature was raised to 724° F., using the same catalyst and the same reaction conditions, the isopentane yield was increased to 56.3% but the selectivity decreased slightly to 98.0%.

In another experiment the catalyst was prepared using the above-described procedure except that sufficient palladium chloride was used in the impregnating solution to produce a palladium concentration on the catalyst of 0.40% and the impregnating solution contained twice the concentration of acetic acid used in the first experiment. The catalyst was dried, pelleted, and activated by reduction with hydrogen as described above. A mixture of hydrogen and n-pentane in a 1:1 mol ratio, and at a pressure of 500 p.s.i.g. and liquid volume hourly space velocity of 3.0, was passed over the catalyst at 700° F. An isopentane yield of 54.8% was obtained. When the isomerization reaction was repeated at a temperature of 725° F., the isopentane yield increased to 59.8%.

EXAMPLE II

A commercial silica-alumina cracking catalyst, containing 87% silica and 13% alumina, was dried to produce a low water content without destroying the gel structure. A 250-gram quantity of this catalyst support was then impregnated with a solution of 1.4 g. of palladium chloride in 250 cc. of 0.90 N hydrochloric acid. The impregnated catalyst mass was dried at 230° F., formed into pellets, and activated by reduction with hydrogen at 975° F. The catalyst thus produced was evaluated as in Example I for activity in the isomerization of n-pentane. Hydrogen and n-pentane in a mol ratio of 1:1, a pressure of 500 p.s.i.g., and a liquid volume hourly space velocity of 3.0, were circulated over the catalyst at 700° F. The yield of isopentane from this run was 39.5%.

Another catalyst sample was prepared using a solution of palladium chloride in 1.34 N hydrochloric acid to produce a palladium metal content on the catalyst support (87/13 silica-alumina) of 0.40%. The catalyst was dried, pelleted, and reduced with hydrogen at 975° F. as above-described. This catalyst was evaluated for activity in the isomerization of n-pentane under the same conditions of pressure, hydrocarbon/hydrogen ratio and flow rate. At 700° F., the yield of isopentane using this catalyst sample was 41.5%.

From the above examples, it is seen that the treatment of a silica-alumina catalyst support with a 5-30% solution of acetic acid produces a catalyst of higher activity than is produced when the catalyst is merely impregnated with a solution of a palladium salt not containing acetic acid. While the process has been described with special emphasis upon the use of acetic acid, it should be understood that other $C_1$-$C_5$ carboxylic acids, such as formic acid, propionic acid, butyric acid, oxalic acid, malonic acid, succinic acid, and valeric acid may be used. It should also be noted that the acid solution may be applied to the catalyst support prior to impregnation of the support with the palladium-containing solution. When this procedure is followed, the catalyst support is first treated with the acid solution and dried at a temperature of about 225°-350° F. The catalyst is then impregnated with an aqueous solution of palladium chloride, either with or without added hydrochloric acid, and the impregnated catalyst reduced with hydrogen at an elevated temperature. The resulting catalyst is of substantially higher activity than the catalyst which is obtained without the use of the carboxylic acid treatment.

The operating conditions for isomerization of normal paraffin hydrocarbons using the catalyst of this invention are normally selected so that denegeration or fouling of the catalyst does not occur. However, the catalyst may become fouled after extremely long process periods and thus may require reactivation or regeneration about once a year. The regeneration procedure which is followed is one in which the catalyst is oxidized to eliminate carbon and other deposits from the catalyst and then reduced. The oxidation and reduction temperatures used are such that the catalyst is not subjected to sintering and the activity of the catalyst remains high. The catalyst is oxidized using air or oxygen at a temperature in the range from about 700° to 950° F., with a temperature of 800°-875° F. being preferred. The oxidized catalyst is then reduced and reactivated by treatment with hydrogen at a temperature in the range from about 750° to 950° F. When the catalyst treated with acetic acid, or other $C_1$-$C_5$ carboxylic acid in accordance with this invention, is regenerated after an extended period of use, the activity of the catalyst may be reduced up to about 4% on each regeneration. However, the catalyst can be regenerated four or five times and still have an activity substantially higher than that of a catalyst which did not receive the initial acetic acid treatment.

In isomerizing normal paraffin hydrocarbons containing four to seven carbon atoms per molecule, in accordance with this invention, the catalyst used is prepared by treating a silica-alumina support with acetic acid or other $C_1$-$C_5$ carboxylic acid either prior to or concomitantly with the impregnation of the silica-alumina support with a palladium-containing solution. The silica-alumina support which is used must be of an acidic nature and must contain from 50 to 95% silica, with 70-90% silica being preferred. The catalyst support is provided with palladium in a concentration of from 0.01 to 1.0%, with a concentration of 0.1 to 0.8% being preferred. In the isomerization of different $C_4$-$C_7$ normal parffin hydrocarbons, the optimum isomerization conditions are different for different hydrocarbons, as shown in Table I.

Table I

| Temperature, °F., for— | Range | Preferred Range |
|---|---|---|
| n-C$_4$ | 700–800 | 725–800 |
| n-C$_5$ | 675–775 | 700–760 |
| n-C$_6$ | 650–740 | 675–725 |
| n-C$_7$ | 600–725 | 625–700 |
| Pressure, p.s.i.g. | 100–1,000 | 350–750 |
| Liquid volume hourly space velocity | 0.5–10.0 | 1–4 |
| H$_2$/hydrocarbon mol ratio | 0.5–5.0 | 1.5–4.5 |

It is apparent that when mixed feed stocks are employed, a compromise must be effected in selecting the temperature which is to be used in order to produce optimum activity and selectivity for the desired isoparaffins without producing substantial amounts of hydrocracking as a concomitant, undesirable side-reaction. The optimum temperature is one which in most cases must be determined experimentally in accordance with the relative proportions of hydrocarbons in the feed. The maximum efficiency in isomerization of the various C$_4$–C$_7$ hydrocarbons is obtained by passing the hydrocarbon feed through a suitable fractionating system to separate the individual hydrocarbons for isomerization under optimum conditions for each hydrocarbon. The products of each isomerization may then be combined into a single product.

While we have described our invention fully and completely as required by the Patent Statutes with special emphasis upon one or more preferred embodiments, we wish it understood that within the scope of the appended claims this invention may be practiced otherwise than as specifically described.

What is claimed is:

1. The method of preparing a hydrocarbon isomerization catalyst which comprises impregnating a precalcined silica-alumina catalyst support, containing 50–95 wt. percent silica, with a 5–30% solution of a C$_1$–C$_5$ carboxylic acid and a solution of a reducible palladium compound in an amount sufficient to produce a palladium concentration of 0.01–1.0 wt. percent on the catalyst support, drying the impregnated catalyst support at about 225°–350° F., and reducing the catalyst with hydrogen at 750°–975° F.

2. A method in accordance with claim 1 in which the catalyst is formed into pellets after impregnation and drying.

3. A method in accordance with claim 1 in which the catalyst is dried at 225°–350° F. after impregnation with the acid solution and before impregnation with the solution of the palladium compound.

4. A method in accordance with claim 1 in which the catalyst support is impregnated with a single solution containing a reducible palladium compound and 5–30 percent of a C$_1$–C$_5$ carboxylic acid.

5. A method of preparing a hydrocarbon isomerization catalyst which comprises impregnating a precalcined silica-alumina support, containing 50–95 wt. percent silica, with an aqueous solution of palladium chloride containing 5–30% acetic acid to produce a palladium concentration of 0.01–1.0%, drying the impregnated support at 225°–350° F., and reducing the catalyst with hydrogen at 750°–975° F.

6. A catalyst produced in accordance with claim 1.

7. A catalyst produced in accordance with claim 2.

8. A catalyst produced in accordance with claim 5.

9. A method of isomerizing C$_4$–C$_7$ normal paraffin hydrocarbons which comprises passing hydrogen and a normal paraffin hydrocarbon at a temperature in the range of about 600°–800° F., sufficient to effect isomerization, a pressure of about 100–1000 p.s.i.g., a liquid volume hourly space velocity of 0.5 to 10.0, and a hydrogen/hydrocarbon mol ratio within the range of about 0.5–5.0, over a catalyst prepared and activated in accordance with claim 1.

10. A method of isomerizing C$_4$–C$_7$ normal paraffin hydrocarbons which comprises passing hydrogen and a normal paraffin hydrocarbon at a temperature in the range of about 600°–800° F., sufficient to effect isomerization, a pressure of about 100–1000 p.s.i.g., a liquid volume hourly space velocity of 0.5 to 10.0, and a hydrogen/hydrocarbon mol ratio within the range of about 0.5–5.0, over a catalyst prepared and activated in accordance with claim 2.

11. A method of isomerizing C$_4$–C$_7$ normal paraffin hydrocarbons which comprises passing hydrogen and a normal paraffin hydrocarbon at a temperature in the range of about 600°–800° F., sufficient to effect isomerization, a pressure of about 100–1000 p.s.i.g., a liquid volume hourly space velocity of 0.5 to 10.0, and a hydrogen/hydrocarbon mol ratio within the range of about 0.5–5.0, over a catalyst prepared and activated in accordance with claim 5.

References Cited in the file of this patent

UNITED STATES PATENTS

| 2,662,861 | Riblett et al. | Dec. 15, 1953 |
| 2,767,148 | Plank | Oct. 16, 1956 |

FOREIGN PATENTS

| 487,392 | Canada | Oct. 21, 1952 |